United States Patent [19]

Loizeau

[11] 4,396,103
[45] Aug. 2, 1983

[54] TORSION DAMPING DEVICE, FOR CLUTCH DRIVEN DISC FOR A MOTOR VEHICLE

[75] Inventor: Pierre Loizeau, Ville d'Avray, France

[73] Assignee: Societe Anonyme Francaise du Ferodo, Paris, France

[21] Appl. No.: 148,275

[22] Filed: May 9, 1980

[30] Foreign Application Priority Data

May 11, 1979 [FR] France .................. 79 11968

[51] Int. Cl.³ .............................. F16D 3/66
[52] U.S. Cl. ................................. 192/106.2
[58] Field of Search ............ 192/106.2, 106.1, 26, 192/35, 54, 93 A; 64/27 CS, 27 S

[56] References Cited

U.S. PATENT DOCUMENTS 1,935,459  11/1933  Ryan et al. .............. 64/27 CS
2,114,247   4/1938  Davis ...................... 192/106.1
3,117,432   1/1964  Schleicher ............... 64/27 CS

FOREIGN PATENT DOCUMENTS 2212468  10/1973  Fed. Rep. of Germany ...... 106.1/

Primary Examiner—George H. Krizmanich
Attorney, Agent, or Firm—Charles E. Brown

[57] ABSTRACT

This relates to a torsion damper device having two coaxial parts mounted for rotation relative to one another, within the limits of a determined angular movement, against the action of springs. The torsion damper device includes in addition at least one locking means which is sensitive to the angular movement between the two parts and which is movable reversibly between a position in which it is inoperative and gives full freedom of action to the springs and a position in which it effects the direct supporting of one part (A) on the part and puts these springs out of action. The torsion damper device is applicable in particular to clutch plate assemblies for motor vehicles.

24 Claims, 27 Drawing Figures

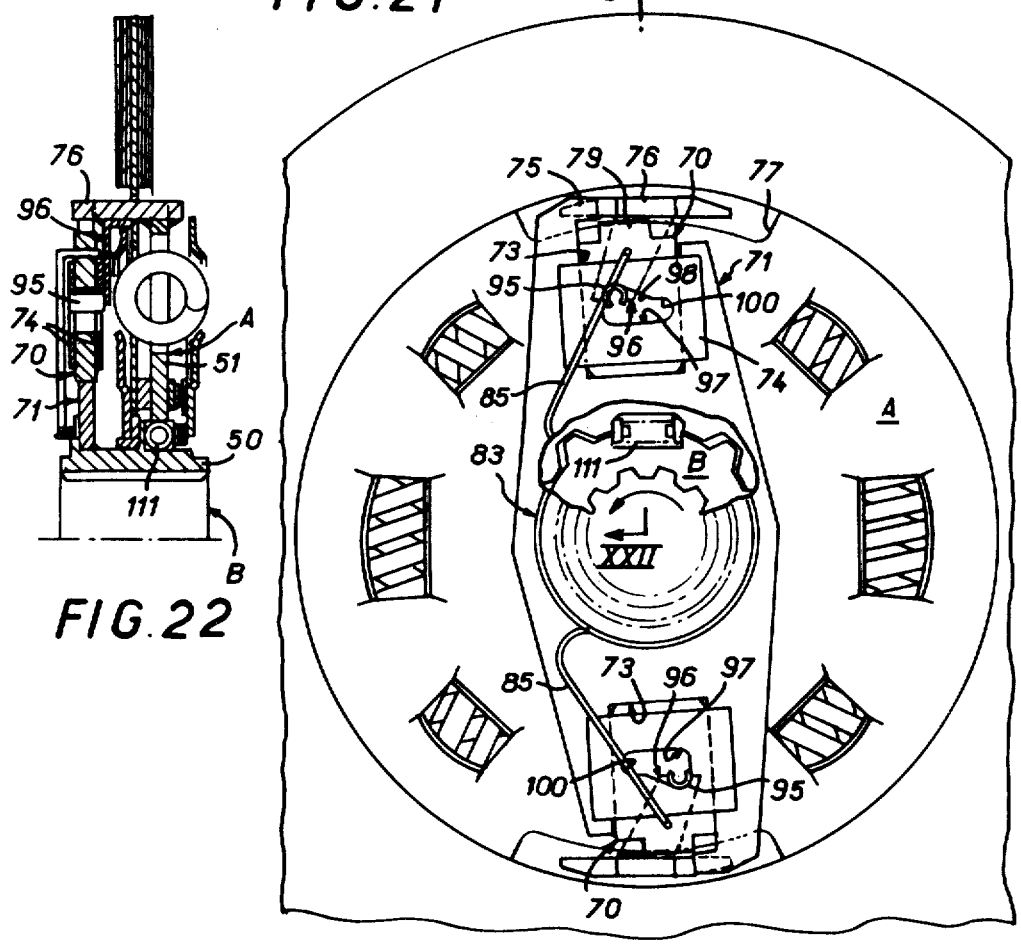
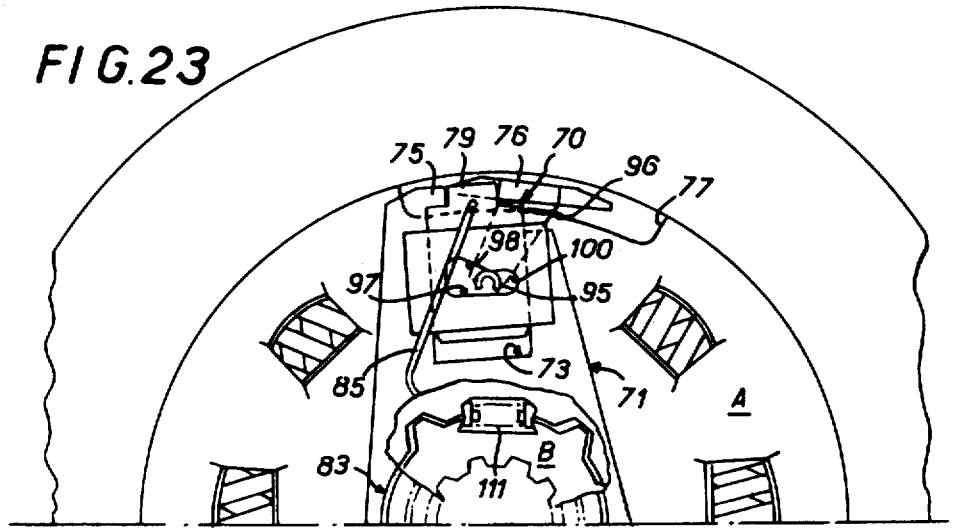

TORSION DAMPING DEVICE, FOR CLUTCH DRIVEN DISC FOR A MOTOR VEHICLE

The present invention relates generally to torsion damper cevices which comprise at least two coaxial parts mounted for rotation relative to one another, within the limits of a determined angular movement range, against the action of elastic means adapted to act circumferentially between the said parts, these means being hereinafter referred to as circumferential action elastic means.

As is known, a torsion damper device of this kind forms part of a clutch plate assembly, particularly for motor vehicles, in which case one of the rotatable parts carries a friction disc intended to be rotationally fixed to a first shaft, which in practice is a driving shaft—the output shaft of an engine, while another of the said rotatable parts is carried by a hub intended to be rotationally fixed to a second shaft, which in practice is a driven shaft—the input shaft of a gearbox.

A device of this kind makes it possible in fact to effect regulated transmission of the torque applied to one of its rotatable parts when the other is itself subjected to a torque, that is to say to filter out the vibrations liable to occur throughout the length of the kinematic chain, extending from the engine to the wheel shafts, in which it is inserted.

As is also known, it is advantageous, at least for certain applications and in particular for application to clutch plate assemblies for motor vehicles, that for the low values of the angular movement between the two rotatable parts of which a torsion damper device of this kind is composed the torque transmitted between them should remain low.

This arrangement, which entails the use of circumferential action elastic means of slight stiffness for the low torque values, in fact makes it possible in particular to eliminate gearbox noise in neutral, when the vehicle concerned is stationary (this noise being referred to hereinafter as neutral noise), particularly in the hot state.

Moreover, it appears that it is at least to a certain extent desirable, from this point of view alone, that the range of angular movement in the course of which these elastic means of slight stiffness thus intervene should be as wide as possible.

But such means are obviously very quickly saturated for a low torque value, as soon as a gear speed has been engaged and the accelerator of the vehicle concerned is operated to achieve so-called "traction" operation of the whole arrangement.

If the action on the accelerator is terminated, the torque between the two rotatable parts constituting the torsion damper disc in question changes direction and the operation of the whole arrangement changes over to so-called "overrun".

This results in instantaneous noisy rocking of one of these parts relative to the other.

This rocking, which also occurs when the change is made from "overrun" operation to "traction" operation, corresponds to the taking-up of play between the two rotatable parts in question because of saturation, first in one direction and then in the other, of the elastic means of slight stiffness acting between them, and is accompanied by a noise which is the louder, the wider the corresponding angular movement range on the one hand and the shorter the gear ratio engaged on the other.

Thus, two contradictory requirements have to be reconciled, one of them relating to the use of an angular movement range in which at low torque values only circumferential action elastic means of slight stiffness intervene in order to achieve good absorption of neutral noises, particularly for diesel engines in which idling speed is particularly low and cyclic accelerations are particularly great, and the other relating to the taking-up of angular play usually associated with such a range when changing over from "traction" operation, with the accelerator pedal depressed, to "overrun" operation with the accelerator pedal released, this taking-up of angular play being also a source of noise and this noise being the greater, the wider the said range.

In order to overcome this difficulty it has been proposed in French Patent Application No. 79 04719 filed on the Feb. 23, 1979 to use a locking means sensitive to centrifugal force against the action of return means, the said locking means being thus mounted for reversible movement between a retracted waiting position, in which it is out of action and thus allows full liberty of action to the circumferential action elastic means interposed between the two parts concerned, and an extended operating position in which, beyond a determined speed of rotation associated with the said return means, it brings about positive circumferential support of one of the said parts on the other for at least one of the directions of rotation, and thus puts the said circumferential action elastic means out of action.

Although this arrangement has given and is still giving satisfaction, for certain vehicles it may prove defective or be difficult to use when the speed of rotation of the engine is low.

This is particularly the case with vehicles equipped with a diesel engine which develops a constant torque and permits the maintaining of the engagement of a gear speed even at low speeds of rotation.

For example, it is possible to maintain the engagement of a gear speed down to about 1000 revolutions per minute when the idling speed of the engine is of the order of 750 revolutions per minute.

Consequently, if the driver relaxes the pressure on the accelerator pedal at so low an engine speed, there will be only a difference of 250 revolutions per minute to permit the intervention of the locking means sensitive to centrifugal force, and this difference may be insufficient to enable this intervention to develop correctly.

The present invention relates generally to an arrangement giving satisfaction with complete safety, even in the case of low speeds of rotation.

More precisely, it relates to a torsion damper device, particularly a clutch plate assembly, especially for motor vehicles, of the type comprising at least two coaxial parts mounted for rotation relative to one another, within the limits of a determined angular movement, against the action of elastic means adapted to act circumferentially between them for at least a range of the said angular movement, the said means being referred to as circumferential action elastic means, which torsion damper device is characterised in that it comprises at least one locking means which is sensitive to the angular movement between the said parts, against the action of return means, and which is thus movable reversibly between a retracted waiting position, in which it is inoperative and therefore gives full freedom of action to the circumferential action elastic means, and an extended operating position in which, beyond a determined angular movement between the said parts, it brings about the positive circumferential support of one of the said parts on the other for at least one of the directions of rotation, and thus puts the said circumferential action elastic means out of action for at least a part of the said movement range.

Thus, although a locking means of this kind is inevitably sensitive to centrifugal force, as a component of a rotatable assembly, it is essentially in dependence on the angular movement between the two coaxial parts constituting the torsion damper device in question, and therefore in practice on the torque transmitted from one of these parts to the other, that for a determined angle of the said movement the passing of this locking means from its retracted waiting position to its extended operating position is controlled in a positive manner.

In other words, this passage is effected reliably whatever the speed of rotation of the device.

The characteristics and advantages of the invention will moreover be clear from the following description, which is given by way of example and with reference to the accompanying diagrammatical drawings, in which.

Figure 1:
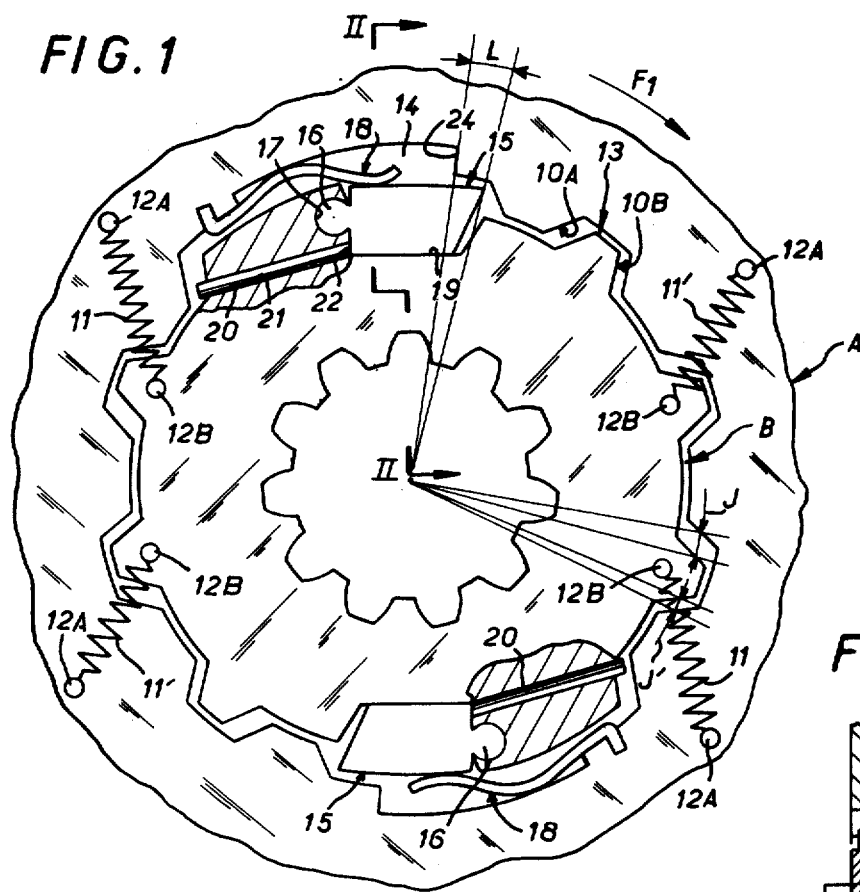
FIG. 1 is a partial view in elevation, with parts broken away, of a torsion damper device according to the invention, the locking means with which it is provided being shown in the retracted waiting position.
Figure 3:
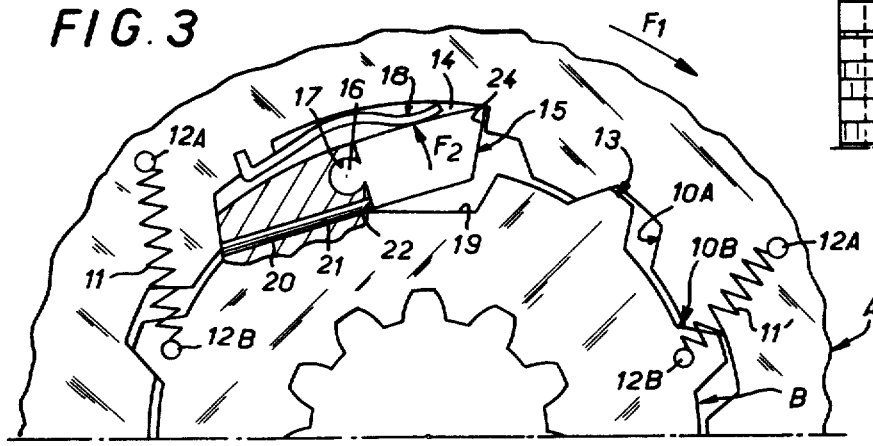
Figure 4:
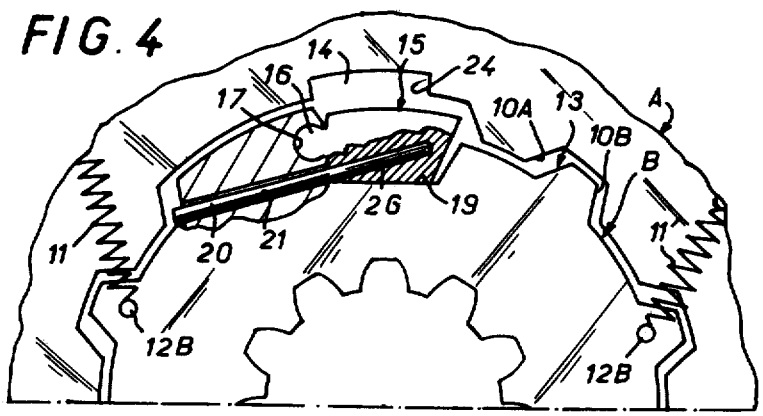
Figure 5:
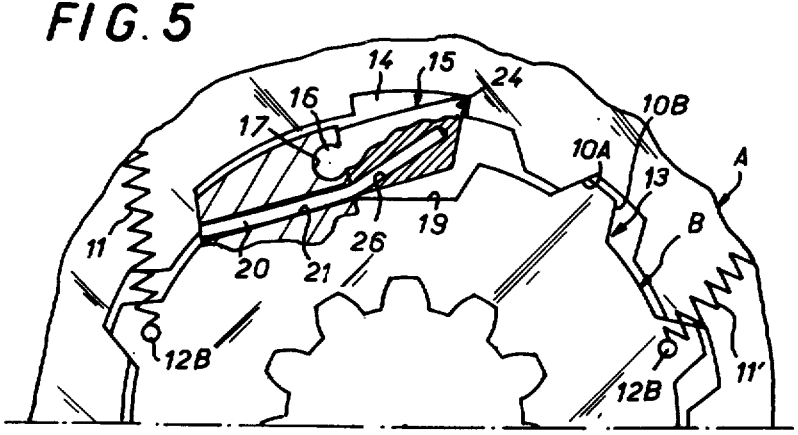
Figure 7:
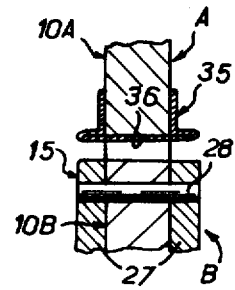
Figure 6:
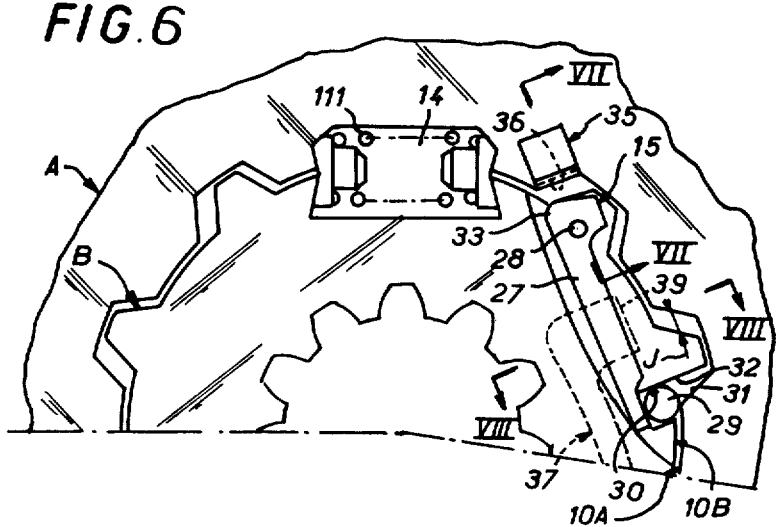
Figure 8:
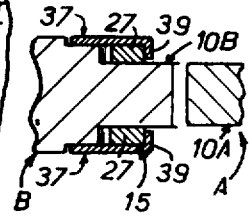
Figure 9:
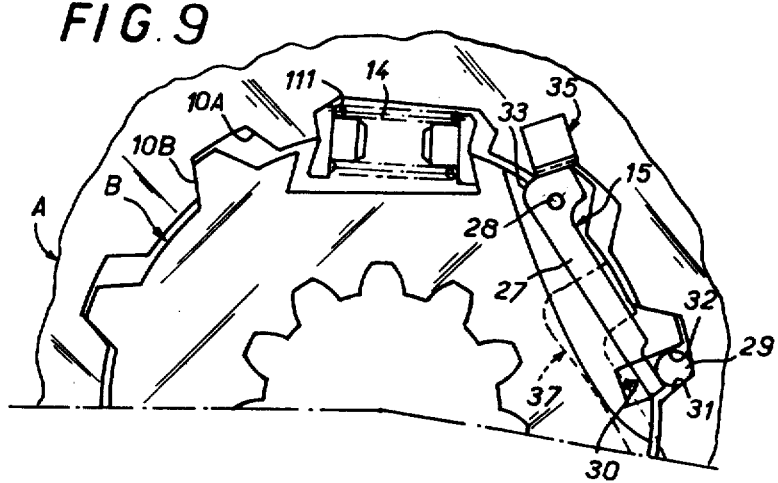
Figure 10:
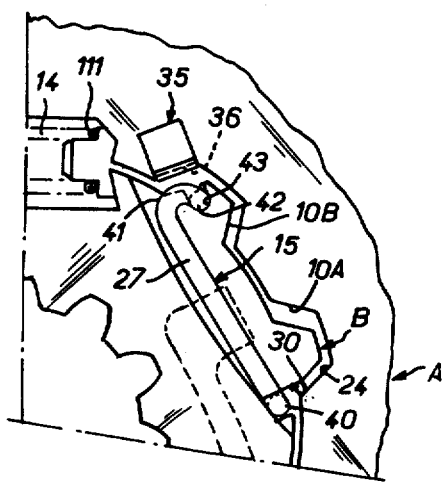
Figure 11:
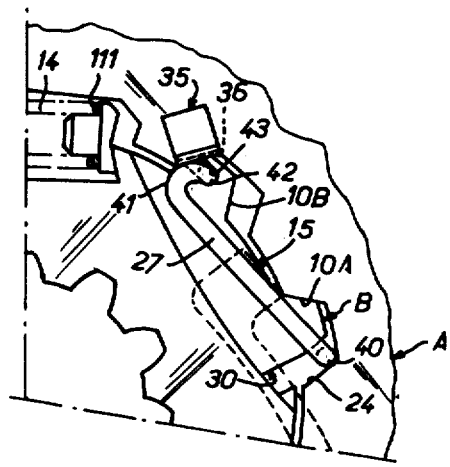
Figure 12:
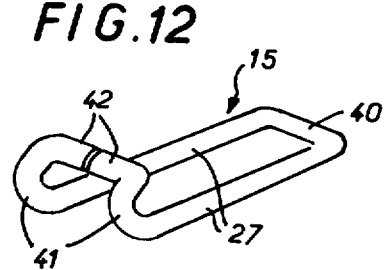
Figures 13, 14, 15, 16, 17:
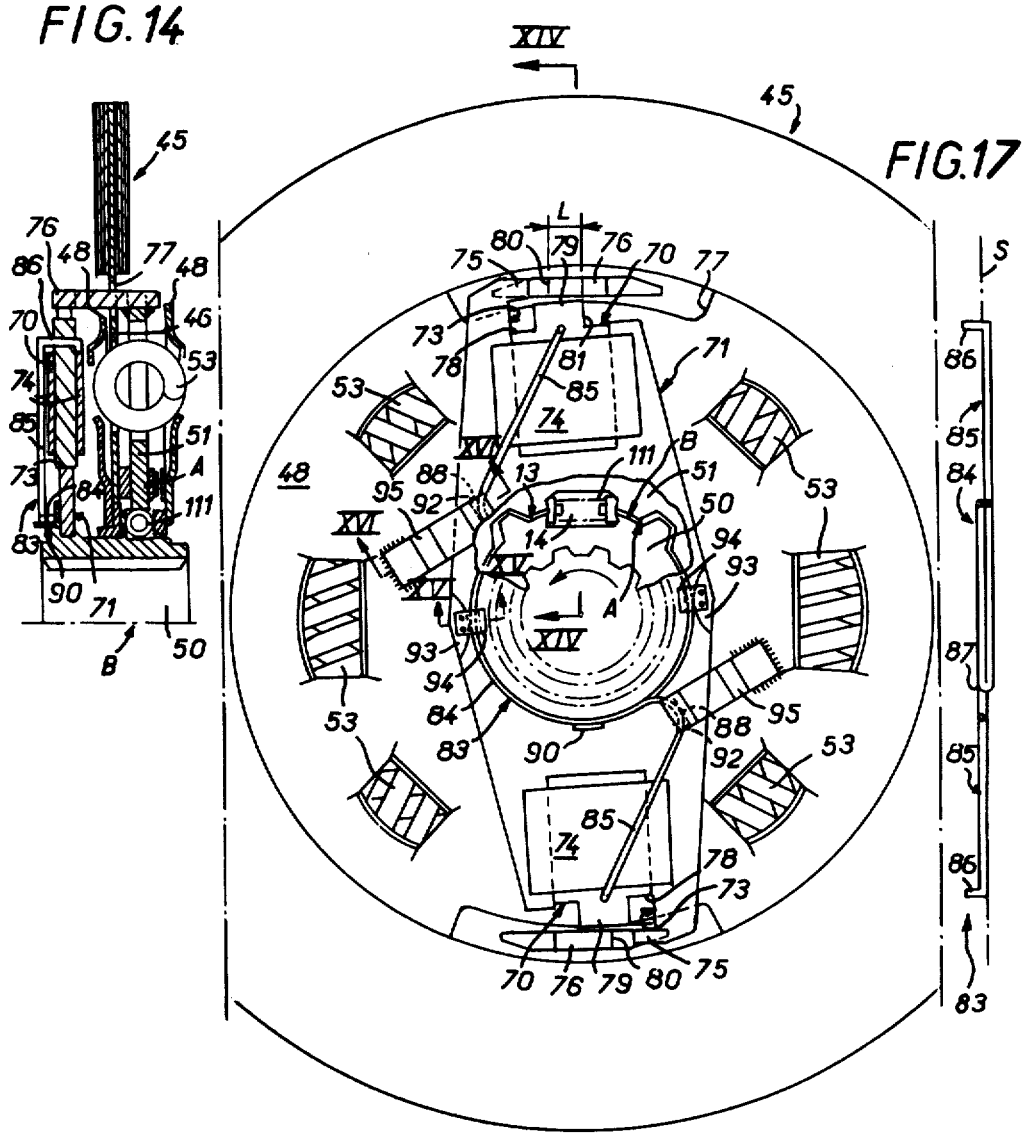
Figure 18:
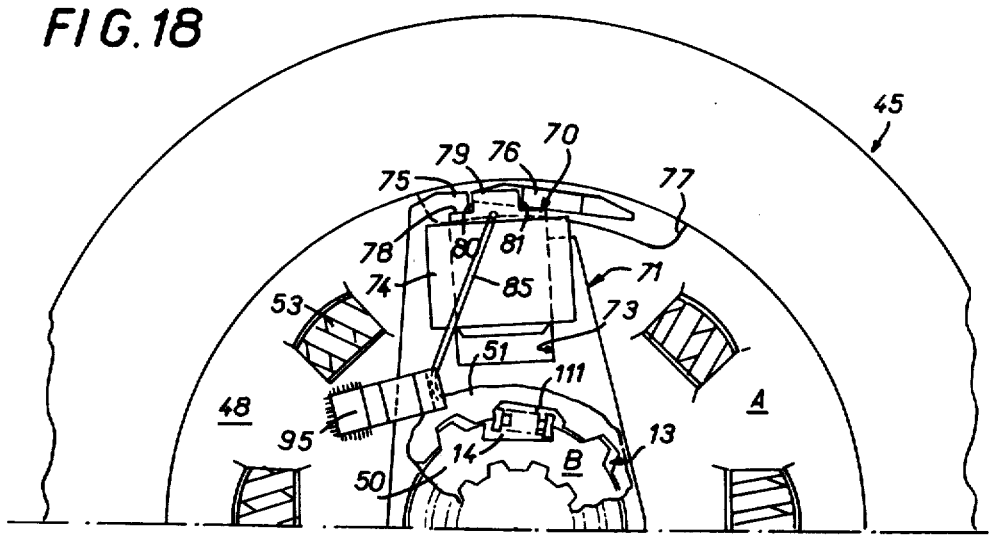
Figure 19:
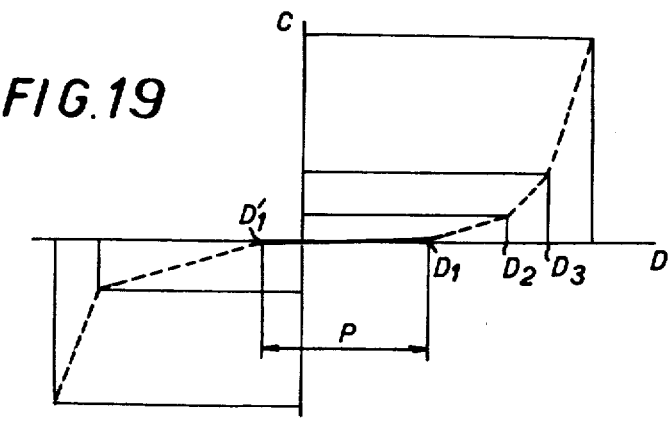
Figure 20:
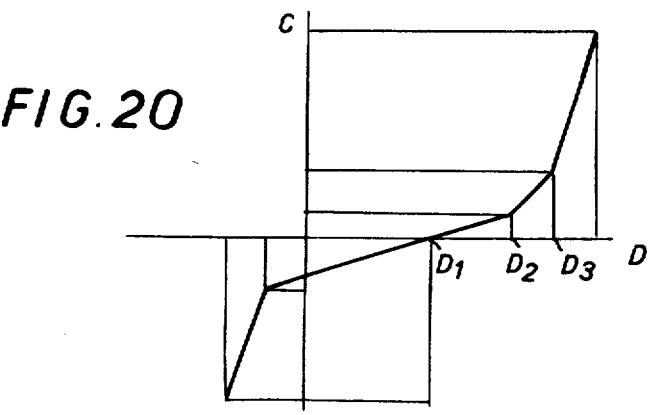
Figure 24:
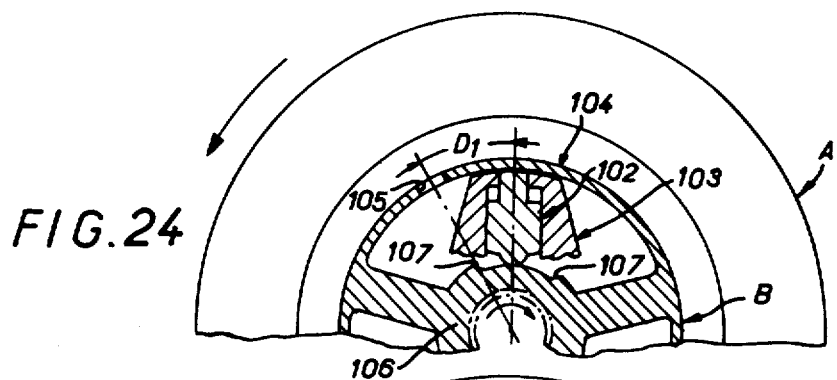
Figure 25:
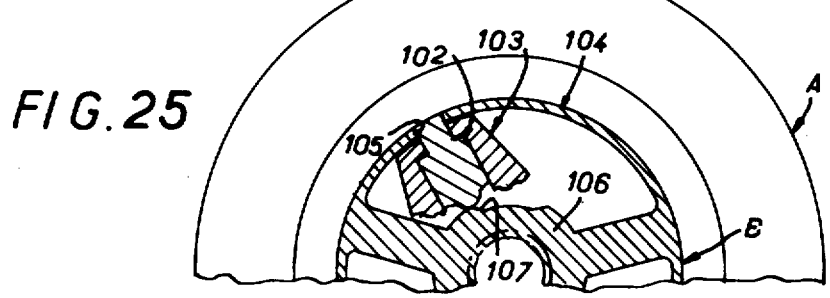
Figure 26:
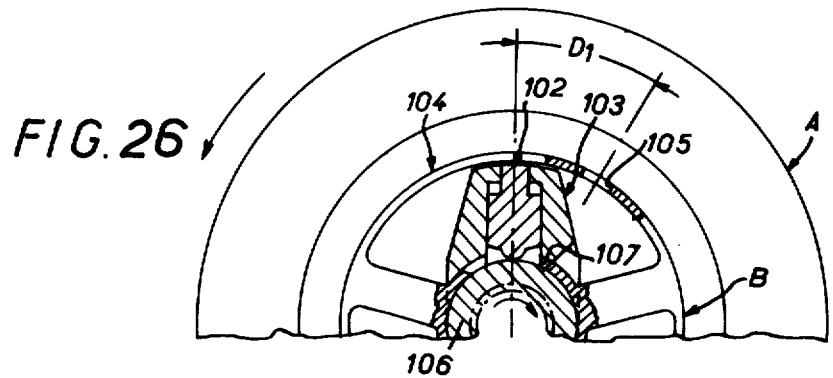
Figure 27:
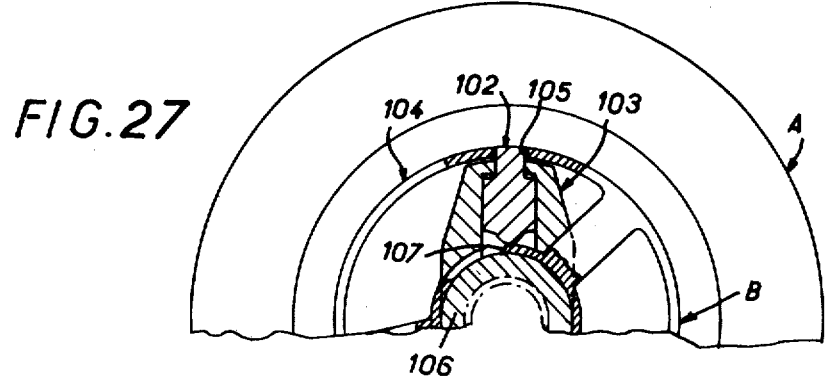

FIG. 3 repeats part of FIG. 1, the locking means with which the torsion damper means of the invention is provided being shown in the extended operative position;

FIGS. 4 and 5 are views respectively similar to those in FIGS. 1 and 3, and relate to a modified embodiment;

FIG. 6 is a partial view similar to that in FIG. 1 and relates to another modified embodiment;

FIGS. 7 and 8 are partial sectional views of this embodiment, the sections being taken respectively on the lines VII—VII and VIII—VIII in FIG. 6;

FIG. 9 is a partial view, similar to that in FIG. 3, of this modified embodiment;

FIGS. 10 and 11 are partial views respectively similar to those in FIGS. 1 and 3, and relate to another modified embodiment;

FIG. 12 is an isolated view in perspective of a locking means used in this modified embodiment;

FIG. 13 is a partial view in elevation, with part broken away, of another torsion damper device according to the invention—in practice a clutch plate assembly, with the locking means with which this torsion damper device is provided shown in the retracted waiting position;

FIG. 14 is a half-view in axial section of this torsion damper device, taken on the line XIV—XIV in FIG. 13;

FIGS. 15 and 16 are partial views in section, taken respectively on the lines XV—XV and XVI—XVI in FIG. 13;

FIG. 17 is a view in axial section of the torsion spring with which this torsion damper device is equipped;

FIG. 18 is a partial view similar to that in FIG. 13, in which the locking means are shown in the extended operating position;

FIG. 19 is a diagram illustrating essentially the mode of operation of a torsion damper device not provided with locking means according to the invention;

FIG. 20 is a diagram similar to that in FIG. 19, for the torsion damper device according to the invention;

FIGS. 21, 22, and 23 are views respectively similar to those in FIGS. 13, 14, and 18 and relate to a modified embodiment;

FIG. 24 is a partial view, partly in elevation and partly in section, of another torsion damper device according to the invention, showing the retracted waiting position of the locking means with which this torsion damper device is equipped;

FIG. 25 is a view similar to that in FIG. 24, showing the extended operating position of these locking means;

FIGS. 26 and 27 are views respectively similar to those in FIGS. 24 and 25, and relate to another modified embodiment.

Generally speaking, and as illustrated in these drawings, the torsion damper device for which the invention is intended comprises at least two coaxial parts mounted for rotation relative to one another, within the limits of a determined angular movement, against the action of elastic means adapted to act circumferentially between them for at least a range of the said angular movement, the said means being referred to as circumferential action elastic means.

Simply for the sake of convenience, one of the said parts will be referred to hereinafter as the exciter part with the general reference A, and the other as the excited part with the general reference B.

Figure 2:
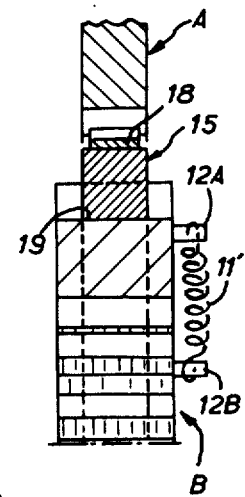
FIG. 2 is a partial view in axial section of this device, taken on the line II—II in FIG. 1.

In the embodiment illustrated diagrammatically in FIGS. 1 to 3, the exciter part A, of which only a part is visible in the Figures, extends concentrically around the excited part B, and meshing means 13 with circumferential play, which comprise toothing 10A for the exciter part A and toothing 10B for the excited part B, are provided between the said exciter part A and excited part B.

The toothing 10B meshes with the toothing 10A, but for the configuration of rest of the arrangement, as defined below and as illustrated in FIG. 1, an angular play J exists between these toothings for the direction of rotation of the exciter part A which is represented by the arrow F1 in FIG. 1, while there is an angular play J' for the opposite direction of rotation.

The configuration of rest of the arrangement is defined by the circumferential action elastic means interposed between the exciter part A and the excited part B.

In the example of embodiment illustrated diagrammatically in FIGS. 1 to 3, these circumferential action elastic means comprise two sets of springs 11, 11' stretched obliquely between, on the one hand, studs 12A fastened to the exciter part A and, on the other hand, studs 12B fastened to the excited part B, the springs 11 intervening for the direction of rotation of the exciter part A marked by the arrow F1 in FIG. 1, and the springs 11' intervening for the opposite direction of rotation.

According to the invention, between the exciter part A and the excited part B at least one locking means sensitive to the angular movement between the said parts is provided.

In practice two locking means are provided, in diametrically opposite positions.

In the embodiment illustrated in FIGS. 1 to 3, each of these locking means is housed in a cavity 14 in the meshing means 13 provided between the exciter part A and the excited part B, this cavity 14 being formed partly in the toothing 10A of the exciter part A and partly in the toothing 10B of the excited part B.

In the embodiment illustrated this locking means comprises a buttress lever 15 which at one of its ends is pivoted on one of the parts A,B concerned (in practice the excited part B in the example of embodiment illustrated) about an axis parallel to that of the said parts and extending generally tangentially to a circumference of the whole arrangement.

For its articulation to the excited part B the buttress lever 15 has projecting from its corresponding end a cylindrical boss 16 of circular section, which in a mounting of the dovetail type is engaged in a complementary cavity 17 in the excited part B, along an axis parallel to the axis of the whole arrangement.

By means of a spring blade 18 which bears against the exciting part A, the buttress lever 15 is permanently urged in the direction of a retracted waiting position in which, as illustrated in FIG. 1, it bears against a radial shoulder 19 on the excited part B.

For the purpose of moving the buttress lever 15 from this retracted waiting position to an extended operating position, which is illustrated in FIG. 3, the lever has associated with it a push-rod adapted to act on it in an eccentric position relative to its axis of rotation, bearing against the exciter part A.

In the embodiment illustrated in FIGS. 1 to 3, this push-rod is formed by a pushing finger 20 mounted for sliding in a bore 21 in the excited part B and adapted on the one hand to bear against the toothing 10A of the exciter part A and on the other hand to come to bear against a shoulder 22 on the buttress lever 15, this shoulder being laterally offset relative to the axis of rotation of the latter.

Under the control of this push-rod 20 and against the action of the spring blade 18, which in this respect constitutes the return means, the buttress lever 15 is thus mounted for movement in a reversible manner between its retracted waiting position and its extended operative position.

In its retracted waiting position the buttress lever 15 is inoperative in the sense that it permits free angular movement between the exciter part A and the excited part B and therefore allows full freedom of action to the springs 11, 11'.

On the other hand, in its extended operative position it brings about the positive circumferential bearing of the nexciter part A against the excited part B, its free end (that is to say the opposite end to its axis of articulation) then coming to bear against an abutment shoulder 24 provided for the purpose, in the cavity 14, on the exciter part A.

In the retracted waiting position the circumferential development L between on the one hand the abutment shoulder 24 and on the other hand the free end of the buttress lever 15 corresponds angularly in fact to at most the angular play J of the meshing means 13 provided between the parts A and B, as defined above.

In practice therefore, in the embodiment shown in FIGS. 1 to 3, the arrangements are such that, if it is assumed that the exciter part A is driven in rotation in the direction of the arrow F1 in FIGS. 1 and 3, the buttress lever 15 will remain in the retracted waiting position as long as the relative angular movement between the exciter part A and the excited part B (which is driven by the exciter part A through the medium of the springs 11,11') remains less than the angular play J.

On the other hand, shortly before the absorption of the play J, the pushing finger 20, since it projects slightly circumferentially beyond the excited part B, is pushed back in the direction of the buttress lever 15 by the exciter part A and causes the said buttress lever to rotate about is axis of rotation in the direction of the arrow F2 in FIG. 3, and at the end of this rotation the lever 15 comes into engagement with the shoulder 24 on the exciter part A.

Thereupon, if the direction of rotational driving of the exciter part A relative to the excited part B is reversed, that is to say becomes the opposite of that indicated by the arrow F1 in FIG. 3, all angular movement between the exciter part A and the excited part B is prevented, since the exciter part A finds positive circumferential support on the excited part B through the buttress lever 15.

Thus, if the torque between the exciter part A and the excited part B should be reversed in a manner characteristic of a change-over from traction operation to overrun operation, any concomitant reversal of the angular movement between the said parts, which could produce noise, is avoided.

Obviously, when the torque between the exciter part A and the excited part B returns to a sufficiently low value for the toothings 10A, 10B no longer to be in mesh with one another, the buttress lever 15 returns to its retracted waiting position through the action of the spring blade 18.

Friction means are preferably provided between the buttress lever 15 and its pivot pin, in order to delay this return to the retracted waiting position and thus to prevent this return from occurring inopportunely when the torque is reversed.

For example, a friction lining can be inserted between the boss 16 constituting the axis of rotation of the buttress lever 15 and the recess 17 in which this boss is rotationally engaged (not illustrated in the drawings).

In the foregoing action each buttress lever 15 obviously intervenes similarly to the description given above.

Furthermore, as will have been understood, these buttress levers 15 intervene for that direction of rotation of the exciter part A relative to the excited part B which corresponds to the absorption of the angular play J, but if desired at least one similar buttress lever may be provided for the opposite direction of rotation, that is to say the direction of rotation corresponding to the absorption of the angular play J'.

In the modified embodiment illustrated in FIGS. 4 and 5, the pushing finger 20 is engaged in a blind hole 26 in the corresponding buttress lever 15 and is elastically deformable.

Thus it constitutes itself the return means associated with this buttress lever.

In the extended operative position of the buttress lever 15 this pushing finger is in fact then subjected to elastic deformation, so that on the liberation of the buttress lever 15 it elastically returns the latter to the retracted waiting position.

In the foregoing, each buttress lever 15 is housed in a cavity 14 in the meshing means 13 provided between the exciter part A and the excited part B.

However, as illustrated by the modified embodiments shown in FIGS. 6 to 12, a cavity 14 of this kind can also be utilised in a manner known per se for the accommodation of a spring 111, the corresponding springs 111 then taking the place of the springs 11, 11' previously described for constituting the circumferential action elastic means interposed between the exciter part A and the excited part B.

In this case, the buttress lever 15 comprises, as illustrated, two arms 27 which are disposed respectively one on each side of one of the toothings 10A, 10B concerned, that is to say in practice, in the example of embodiment illustrated, the toothing 10B of the excited part B.

In the embodiment illustrated in FIGS. 6 to 9 these arms 27 form separate parts joined together by one and the same pivot pin 28, which passes through the toothing 10B.

Furthermore, in this embodiment the buttress lever 15 acts at its opposite end to its pivot pin 28 on a roller 29, which extends axially in a recess 30 provided for the purpose in the periphery of the toothing 10B and which is adapted to be wedged between two shoulders, of which one, 31, is oblique and formed on the toothing 10A of the exciter part A and the other, 32, is straight and formed by the corresponding flank of the said toothing 10B belonging to the excited part B.

Moreover, in this embodiment the push-rod associated with the buttress lever 15 forms an integral part of the latter, each of the arms 27 of this buttress lever 15 being provided with a boss 33 situated in an eccentric position relative to the pivot pin 28.

Conjointly, the toothing 100A of the exciter part A is adapted to come into action against these bosses 33 of the buttress lever 15 shortly before the angular play J is taken up, because the said bosses 33 slightly project circumferentially beyond the excited part B and, in the embodiment illustrated, a stirrup 35 is for this purpose engaged over the edge of a shoulder 36 provided on the exciter part A opposite the corresponding end of the buttress lever 15.

Finally, in the embodiment illustrated the return means associated with the said lever comprise two metal plates 37 forming spring blades and fixed by one of their ends to the toothing 10B of the excited part B (this fastening not being shown in the drawings), while at their other end they have a return 39 by which they are adapted to act on the buttress lever 15 (FIG. 8).

The functioning of this embodiment is similar to that previously described: the buttress lever 15 is normally held in the retracted waiting position (FIG. 6), but shortly before the absorption of the angular play J between the exciter part A and the excited part B the stirrup 35 of the exciter part A comes to act on the bosses 33 and thus forces the buttress lever 15 to pass into the extended operative position (FIG. 9), in which the roller 29, which is displaced in the recess 30 in the excited part B, is wedged between the shoulder 31 on the exciter part A and the shoulder 32 on the excited part B, so that the exciter part A finds circumferential support on the excited part B through the said roller 29 when the torque is reversed, and the spring blades 37 then bring the buttress lever 15 back into the retracted waiting position when the torque between the exciter part A and the excited part B has returned to a sufficiently low value.

In the modified embodiment illustrated in FIGS. 10 to 12 the buttress lever 15 is composed of a wire substantially bent into a loop and therefore comprising, in addition to two lateral arms 27, a median cross-part 40 which connects these lateral arms together and which takes the place of the roller 29 in the previous embodiment.

At the end of these lateral arms 27 the buttress lever 15 has two crook-shaped bends 41 which together form the boss constituting the push member enabling the buttress lever 15 to be rocked, as described above, from its retracted waiting position (FIG. 10) to its extended operative position (FIG. 11).

Finally, each of the bends 41 of this buttress lever 15 is provided at its end with rightangled returns 42 directed towards one another and forming pivot pins by which this buttress lever 15 is mounted pivotally in a recess 43 in the toothing 10B of the excited part B.

The functioning of this modified embodiment is similar to that of the embodiment described with reference to FIGS. 6 to 9, with the difference that, since the median bar 40 forms an integral part of the buttress lever 15, the latter is thus adapted to come to bear itself, by its respective end, against the abutment shoulder 24 provided for the purpose on the excited part B, as in the embodiments described with reference to FIGS. 1 to 8.

FIGS. 14 to 20 illustrate the application of the invention to a clutch plate assembly comprising three coaxial parts adapted to rotate two by two relative to one another, a first part comprising a friction disc 45 and two guide discs 48, a second comprising a hub disc 51, and a third comprising this hub 50.

A clutch plate assembly of this kind is described in detail in French Patent filed on the 29th Aug. 1973 under No. 73 31172 and published under No. 2,242,606 and also in the Addition filed on the 12th Apr. 1974 under No. 74 12915 and published under No. 2,270,491, attached to the said patent.

This clutch plate assembly does not in itself form part of the present invention, and it will therefore not be described here in full detail; it will be sufficient to recall that springs 53 intervene circumferentially between the part composed of the friction disc 45 and the guide discs on the one hand and the part composed of the hub disc 51 on the other hand.

Here only an exciter part A composed of the hub disc 51 and an excited part B composed of the hub 50 will be taken into account.

Between this exciter part A and the excited part B are provided meshing means 13, which have angular plays J and J', and springs 111 of the type used in the embodiments described in detail with reference to FIGS. 1 to 12.

As previously, use is made of two locking means sensitive to the angular movement between the exciter part A and the excited part B and disposed in diametrically opposite positions.

In the embodiment illustrated these means are simple plates 70.

In order to support and guide them, one of the parts A, B in question (for example the hub 50 in the example illustrated) carries radially a bracket 71 which is rotationally fixed thereto, this bracket being for example engaged by force on the hub 50 and crimped on the latter in accordance with a technique known per se.

The bracket 71 has two guides which are extended radially and with each of which a plate 70 is in engagement.

In the example of embodiment illustrated such a guide is simply composed of a recess 73 in the bracket 71, and the corresponding plate 70 is simply mounted for sliding in such a recess 73.

For the axial support of a plate 70, two strips 74 are attached to the latter, for example by welding, on each side of the bracket 71, and these strips 74 project circumferentially from the corresponding recess 73.

At the end of each recess 73 the bracket 71 has a retaining beak 75 which projects circumferentially into the said recess 73.

Conjointly, the other of the parts A, B (the hub disc in the example of embodiment illustrated) carries, in a position corresponding to each retaining beak 75 of the bracket 71, a lug 76 which extends axially in the direction of the said bracket, passing through a passage 77 in the web 46 of the friction disc 45, and which is extended axially sufficiently to interfere with the corresponding path of the plate 70 in the recess 73 in which the said plate is adapted to slide.

Beyond a shoulder 78 adapted to cooperate as a radial stop with the corresponding retaining beak 75 each plate 70 has a radial extension 79 adapted to be inserted circumferentially between this retaining beak 75 and the corresponding axial lug 76.

In practice, in the position of rest shown in FIG. 17, the circumferential development L between on the one hand the lateral edge 80 of a lug 76 which circumferentially is nearest to the corresponding retaining beak 75, and on the other hand the lateral edge 81 of the radial extension 79 of the corresponding plate 70 which circumferentially is the most distant from this retaining beak 75, corresponds angularly to, at most, the angular play J of the meshing means 13 provided between the parts A, B, as defined above.

Moreover, each retaining beak 75 obviously has a sufficiently small circumferential development not to oppose engagement, facing its own lateral edge, of the extension 79 of the corresponding plate 70.

In the example of embodiment illustrated the two plates 70 have in common the return means associated with them, and these means consist of a torsion spring 83 in which the median torsion portion 84 surrounds the hub 50 of the excited part B, and whose branches 85 are each respectively in engagement, by means of an axial return 86, with the plates 70, such a return 86 being engaged in a passage provided for this purpose in the corresponding plate and being folded over at its end beyond the said passage.

In the example of embodiment illustrated the torsion spring 83 is disposed axially beyond the bracket 71 in relation to the friction disc 15, but it is obvious that as an alternative it could equally well be disposed between the said bracket 71 and the said friction disc 15.

According to one feature of the invention, and as can be seen in FIG. 21, the median torsion portion 84 of the spring 83, from which start the branches 85 of the latter, is formed by conjointly helically winding the two strands of a wire previously folded into U-shape.

In other words, this median torsion portion 84 has an end at which it makes a bend 87, and the transverse plane, perpendicular to the axis of the whole arrangement, which passes through this bend 87 is a plane of symmetry S for the spring 83; this plane of symmetry S is shown in broken lines in FIG. 17.

At its connection to the median portion 84 from which it starts, each branch 85 of the spring 83 forms a bend 88 in the direction of the corresponding plate 70 (FIGS. 13 and 16).

On the internal periphery of the median torsion portion 84 of the spring 83 right-angled plates 90 are attached from place to place, for example by welding, on the bracket 71 in order to provide suitable support for this torsion spring 83 (FIGS. 13 and 14).

In the embodiment illustrated in FIGS. 13 to 18, for the purpose of bringing about the movement of the plates 70 to the extended operative position the median torsion portion 84 of the spring 83 is angularly locked on the hub 50 which it surrounds and which belongs to the excited part B, and with each of the branches 85 of this torsion spring there is associated a shoulder 92 which is solid with the exciter part A and against which such a branch 85 is adapted to come to bear by its bend 88.

In the example of embodiment illustrated the median torsion portion 84 of the spring 83 is secured to the hub 50 by gripping, this median portion being situated between two diametrically opposite bosses 93 on the bracket 71 fastened to the hub 50 (FIGS. 13 and 15) on the one hand, and lugs 94 attached, for example by welding, to these bosses 93, on the other hand.

Furthermore, in the example of embodiment illustrated each shoulder 92 is formed at the end of a lug 95 attached, for example by welding, to the corresponding guide disc 48 which belongs to the exciter part A (FIGS. 13 and 16).

In the absence of the locking means according to the invention, the diagram illustrating the functioning of the clutch plate assembly would be as shown in FIG. 23, which corresponds to the prior art.

In this diagram the abscissa shows the angular movement D, and the ordinate to torque C transmitted between the friction disc 45 and the hub 50.

For low values of this torque—such as occur in neutral with the vehicle stationary—only the springs 11 used between the hub disc 51 and the hub 50, that is to say therefore between the exciter part A and the excited part B considered here, will intervene.

These springs 111, which have slight stiffness, constitute a first damping stage, suitable for eliminating neutral noises.

As soon as the torque increases for traction operation, this first damping stage is saturated and, the angular play J defined above having been absorbed, the hub disc 51 comes into direct engagement with the hub 50 at a value D1 of the movement corresponding to this angular play J.

A first group of springs 53 used between the guide discs 48 and the hub disc 51 then comes into action, followed in succession at values D2,D3 of the angular movement by a second and a third group of such springs, until saturation is reached of the second damping stage formed conjointly by all the springs 53, according to processes which do not form part of the present application and therefore will not be described in detail here.

For overrun operation a similar process develops, with the reservation that in the example of embodiment illustrated the second and third groups of springs 53 come into action simultaneously, it being understood that they could just as well come into action successively, as in the previous case.

All in all, the springs 111 of the first damping stage thus act in a neutral noise filtration zone P extending from the angular movement D1 for traction to an angular movement D'1 for overrun operation.

In the stationary state (FIG. 13) the plates 70 constituting the locking means according to the invention occupy in practice their retracted waiting position, bearing against the bottom of the corresponding recess 73 in the bracket 71.

These plates 70 then have no effect.

They therefore leave full freedom of action to the springs 11 and everything takes place as if the diagram representing the operation of the clutch plate assembly according to the invention were still, between the angular movement D1, D'1, that shown in FIG. 19.

It is for this reason that in FIG. 19 this diagram is shown in solid lines for the filtration zone P and in broken lines outside that zone.

For traction operation, in proportion as the corresponding angular movement proceeds between the exciter part A and the excited part B the shoulders 92 provided for this purpose on the exciter part A start to push the bends 88 of the branches 85 of the torsion spring 83 and under this action the said branches progressively bring about a radial displacement of the plates 70 along their guides in the direction of the corresponding retaining beak 75.

Conjointly, the axial lugs 76 of the hub disc 51 progressively move circumferentially away from these retaining beaks 75.

For the angular movement D1 corresponding to the absorption of the angular play J between the exciter part A and the excited part B the plates 70 then occupy an extended operative position in which (FIG. 18) they are radially in abutment by their shoulder 78 against the retaining beaks 75, while their extension 79 in circumferentially inserted between the said beaks and the axial lugs 76 of the hub disc 51.

Consequently, if the assembly passes from the traction mode of operation to the overrun mode, the axial lugs 76 come to bear against the extensions 79 of the plates 70, and the hub disc 51 thus finds positive circumferential support on the hub 50 through the axial lugs 76, the extensions 79 of the plates 70, and the bracket 71, without there being an inverse angular movement between the said hub disc 51 and the hub 50, and therefore without any noise at all being produced.

In other words, the springs 111 of the slight stiffness stage are then put out of action.

In the diagram representing the corresponding functioning (FIG. 20) the neutral noise filtration zone previously described under the reference P in FIG. 19 is eliminated.

Everything therefore takes place as if only the springs 53 of the second stage of the clutch plate assembly then intervened for the filtration of traction or overrun noise.

If the circumferential development L specified above corresponds exactly to the angular play J, the springs 95 are put out of action, under overrun conditions, at the abscissa point L1; if this circumferential development L corresponds angularly to a lower value than that of the angular play J, this occurs at an abscissa point lower than that of the point D1.

As illustrated, play may subsist circumferentially between the extensions 79 of the plates 70 and the retaining beaks 75, these plates 70 being supported on the bracket 71 by their corresponding lateral edge in the corresponding recess 73 of the said bracket 71; as an alternative, the extensions 79 of the plates 70 may bear circumferentially against the retaining beaks 75, the latter then having a dual function of circumferential support and radial retention.

Obviously, for low torques, as soon as the angular movement between the exciter part A and the excited part B again becomes lower than that corresponding to the abscissa point D1, the plates 70 escape from the axial lugs 76 of the hub disc 51 and are progressively brought back to the retracted waiting position by the branches 85 of the torsion spring 83 to which they are coupled.

As previously, friction means (not shown in the drawing) are preferably provided between the plates 70 and the recesses 73 in which they are slidably mounted, in order to delay their return to the retracted waiting position.

In the modified embodiment illustrated in FIGS. 21 to 23, cam means are provided between the plates 70 and the exciter part A.

In the example of embodiment illustrated, these cam means comprise, for each plate 70, a finger 95 carried axially by an angle 96 fastened to the axial lug 76 corresponding thereto, together with a button-hole 97 having an oblique flank 98 and provided in the said plate 70, the finger 95 being engaged in the buttonhole 97 and bearing against the oblique flank 98 of the latter.

In practice, in the example of embodiment illustrated, the buttonhole 97 has at the end of its oblique flank 98 a circumferential extension 100.

The functioning of this modified embodiment is similar to that described previously: in proportion as the angular movement between the exciter part A and the excited part B proceeds, the fingers 95 associated with the plates 70 progressively bring about a radial displacement of the latter which, after absorption of the angular play J, causes them to be inserted circumferentially, by their extension 79, between the retaining beaks 75 and the axial lugs 76 (FIG. 23).

If such an angular movement continues, the fingers 95 follow the circumferential extensions 100 of the buttonholes 97 without interfering with the operation of the whole arrangement.

In the modified embodiments illustrated in FIGS. 24 to 27, in which the exciter part and the excited part B are only summarily shown, the locking means used forms a bolt 102, which is mounted for radial sliding in a guide 103 fastened to a first of these parts A,B, facing a ring 104 fastened to the second of the said parts, this ring having an opening 105 forming a keeper for the bolt 102 and being carried by a hub 106 provided on the surface with cam means 107 adapted to urge the bolt 102 in the direction of the keeper 105, these cam means 107 being angularly disposed in a position corresponding to the opening forming the keeper 105.

In the embodiment illustrated in FIGS. 24 and 25 the guide 103 belongs to the exciter part A, while the ring 104 belongs to the excited part B.

As an alternative (FIGS. 26 and 27), the guide 103 belongs to the excited part B, while the ring 104 belongs to the exciter part A.

Whichever arrangement is adopted, in the stationary state (FIGS. 24 and 26) the guide 103, and therefore also the bolt 102, are angularly distant from the opening forming the keeper 105 and from the cam means 107.

On the other hand, as soon as the angular movement of the exciter part A and excited part B reaches a determined value, for example the value D1 indicated above, the bolt 102 is situated facing the opening forming the keeper 105 and, under the thrust of the cam means 107—which in practice is a simple inclined surface, it penetrates into this opening (FIG. 25).

The exciter part A then finds positive circumferential support on the excited part B, as previously, through the guide 103, the bolt 102, the ring 104, and the hub 106.

Obviously, return means are provided to bring the bolt 102 back to its retracted position of rest when the the angular movement between the exciter part A and the excited part B becomes once again lower than the value D1.

Moreover, as previously, friction means are preferably provided between the bolt 102 and the guide 103 in order to delay the return of this bolt to the retracted position of rest.

As will have been understood, in all the embodiments described above the locking means used in accordance with the invention is or are inevitably sensitive to centrifugal force, and the latter can have a positive effect on them, in practice at sufficiently high speeds.

However, the movement of this or these means to the extended operative position is effected positively regardless of this speed.

As is the case in practice, this movement can thus take place at insufficiently high speeds for centrifugal force to have any substantial effect.

The present invention is obviously not limited to the embodiments described and illustrated, but includes any modified embodiment and/or combination of their various elements.

I claim:

1. A torsion damper device, particularly a clutch plate assembly, of the type comprising at least two coaxial parts (A,B) mounted for rotation relative to one another within the limits of a determined angular movement against the action of circumferential action elastic means (11, 111) adapted to act circumferentially between them for at least a range of the said angular movement, characterised in that torsion damper device comprises at least one locking means (15, 70, 102) which is sensitive to the angular movement between said parts (A,B) against the action of return means, said locking means being movable reversibly between a retracted waiting position in which said locking means is inoperative and gives full freedom of action to said circumferential action elastic means (11, 111) and an extended operative position in which beyond a determined angular movement between the said parts (A, B) said locking means brings about the positive circumferential support of one of said parts (A, B) on the other of said parts for at least one of the directions of rotation, and thus puts said circumferential action elastic means (11, 111) out of action for at least a part of the said movement range.

2. A torsion damping device according to claim 1, characterised in that said locking means (15) is a buttress level which at one of its end is mounted pivotally on a first of said parts (A, B) about an axis parallel to that of said parts, and with which for the purpose of moving said buttress lever to the extended operative position there is associated a push-rod (20) adapted to act on said buttress lever in an eccentric position relative to its axis of rotation by bearing against a second of said parts (A, B).

3. A torsion damper device according to claim 2, characterised in that said push-rod (20) associated with said buttress lever (15) is formed by a pushing finger mounted for sliding on said second part.

4. A torsion damper device according to claim 3, characterised in that said pushing finger (20) is engaged in a blind hole (26) on said buttress lever (15) and is elastically deformable so that it constitutes itself the return means associated with the said buttress lever (15).

5. A torsion damper device according to claim 2, characterised in that said push-rod (20) associated with the buttress lever (15) forms an integral part of said buttress lever, said push-rod being formed by a boss (33) on said buttress lever.

6. A torsion damper device according to claim 2, characterised in that said buttress lever (15) is composed of a wire substantially folded into a loop and having a median cross-part (40), two lateral arms (27), and at ends of said lateral arms two crook-shaped bends (41) which together constitute the boss of said buttress lever which forms the push-rod associated with said buttress lever.

7. A torsion damper device according to any of claims 2 to 6, characterised in that said buttress lever has a free end opposite to said buttress lever articulation axis adapted to come to bear against an abutment shoulder (24) provided for the purpose on the second of said parts (A, B).

8. A torsion damper device according to any of claims 2 to 6, characterised in that said buttress lever has a free end opposite to said buttress lever articulation axis acting on a roller (29) adapted to become wedged between two shoulders (31, 32), one of said shoulders belongs to one of the two parts (A, B) concerned and the other of said shoulders belongs to the other of the said parts (A, B).

9. A torsion damper device according to any one of claims 2 to 6, in which meshing means (13) having circumferential play are provided between said two parts (A, B), characterised in that said buttress lever (15) is housed in a recess (14) in said meshing means (13).

10. A torsion damper device according to any of claims 2 to 6, in which meshing means (13) having circumferential play are provided between said two parts (A, B), said meshing means (13) comprising a toothing (10A) for one of the said parts and a toothing (10B) for the other, characterised in that the buttress lever (15) comprises two arms (27), each disposed respectively on each side of such a toothing (10A, 10B).

11. A torsion damper device according to any of claims 2 to 6, characterised in that said buttress lever (15) extends substantially tangentially to a circumference of the whole arrangement.

12. A torsion damper device according to any of claims 2 to 6, characterised in that friction means are provided between said buttress lever (15) and a pivot pin for said buttress lever to delay the return of said buttress lever to the retracted position under the action of said return means.

13. A torsion damper device according to claim 1, characterised in that said locking means is composed of a simple plate (70) mounted for sliding in a plane perpendicular to the axis of the device, and that the return means associated with said locking means comprise a torsion spring (83) having a median torsion portion (84) which surrounds a hub (50) fastened to a first of said rotatable parts (A, B), and said torsion spring having one branch (85) which is coupled to said plate (70).

14. A torsion damper device according to claim 13, characterised in that for the passage of the said plate to the extended operative position said branch (85) of said torsion spring (83) which is coupled to said plate (70) has a bend (88) by which it is adapted to come to bear against a shoulder (92) solid with said other of said rotatable parts (A, B), and said median torsion portion (84) of said spring (83) is angularly locked, for example by gripping, in relation to said hub (50) which it surrounds.

15. A torsion damper device according to claim 13, characterised in that, for the purpose of moving said plate (70) to the extended operative position, cam means (95, 97) are provided between said plate and said other of said parts (A, B).

16. A torsion damper device according to claim 15, characterised in that the said cam means (95, 97) comprise a finger (95) carried axially by said other part (A, B) and also a buttonhole (97) having an oblique flank (98) and being formed in said plate (70), said finger (95) being engaged in the said buttonhole (97).

17. A torsion damper device according to claim 16, characterised in that said buttonhole (97) has a circumferential extension (100).

18. A torsion damper device according claim 1, characterised in that two of said locking means (70) are provided in diametrically opposite positions, each of said two locking means being composed of a plate, and said two locking means (70) have a common return spring (83) with two branches (85), said branches of said common return spring each being coupled respectively to a locking means plate (70) and having a median torsion portion (84) from which said return spring branches start being formed by conjointly helically winding two strands of a wire previously folded into U-shape.

19. A torsion damper device according to claim 13, characterised in that one of said parts (A, B) carries a guide (73) with which said plate (70) forming said locking means is in engagement, and said other of said parts (A, B) has a lug (76) which extends axially and which interferes with the path of said plate (70) along a guide (73) for said plate.

20. A torsion damper device according to claim 19, characterised in that the said guide (73) includes a radially elongated recess formed in a bracket (71) fastened to said one part (A, B) and in which said plate (70) forming said locking means is mounted for sliding.

21. A torsion damper device according to claim 20, characterised in that the said bracket (71) is provided at the end of said recess (73) forming said guide with a retaining beak (75) which projects into the said recess (73), and beyond a shoulder (78) is adapted to cooperate radially as an abutment against said retaining beak (75), said plate (70) forming said locking means has a radial extension (79) against which an axial lug (76) of said other part (A, B) is adapted to come to bear.

22. A torsion damper device according to any one of claims 20 or 21, characterised in that the said bracket (71) is fastened to said hub (50) of said one part.

23. A torsion damper device according to claim 1, characterised in that said locking means forms a bolt (102) which is mounted for radial sliding in a guide (103) fastened to a first of said rotatable parts (A, B) facing a ring (104) fastened to a second of said rotatable parts (A, B), said ring (104) having an opening forming a keeper (105) for said bolt (102) and being carried by a hub (106) having on a surface of said hub cam means (107) adapted to urge said bolt (102) in the direction of the said keeper (105).

24. A torsion damper device according to claim 19, characterised in that friction means are provided between one of said locking means (70, 102) and its guide (73, 103) in order to delay the return of said locking means (70, 102) to the retracted position under the action of the return means associated with it.

* * * * *